(12) United States Patent
Meyer et al.

(10) Patent No.: US 7,730,159 B1
(45) Date of Patent: *__Jun. 1, 2010__

(54) METHOD AND APPARATUS FOR DYNAMICALLY LOCATING RESOURCES

(75) Inventors: Gordon Ross Meyer, Santa Clara, CA (US); Jessica Kahn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/647,057

(22) Filed: Dec. 27, 2006

Related U.S. Application Data

(62) Division of application No. 10/263,008, filed on Oct. 1, 2002.

(51) Int. Cl.
*G06F 15/16* (2006.01)

(52) U.S. Cl. ............... 709/217; 709/201; 709/203; 709/229; 709/231; 709/232

(58) Field of Classification Search ............ 709/203, 709/216, 238, 201, 217, 229, 231, 232
See application file for complete search history.

(56) References Cited

U.S. PATENT DOCUMENTS

| | | | | |
|---|---|---|---|---|
| 5,754,774 A | * | 5/1998 | Bittinger et al. | 709/203 |
| 6,038,601 A | * | 3/2000 | Lambert et al. | 709/226 |
| 6,505,243 B1 | * | 1/2003 | Lortz | 709/220 |
| 6,735,741 B1 | * | 5/2004 | Pannu | 715/234 |
| 6,757,706 B1 | * | 6/2004 | Dong et al. | 709/203 |
| 6,976,057 B2 | * | 12/2005 | Yoshiasa | 709/216 |
| 2003/0088716 A1 | | 5/2003 | Sanders | |
| 2006/0206450 A1 | | 9/2006 | Fletcher et al. | |
| 2008/0209410 A1 | * | 8/2008 | Demsky et al. | 717/168 |

OTHER PUBLICATIONS

U.S. Appl. No. 10/263,008, PTO-892 mailed with Jun. 2, 2006 Nonfinal Office Action, 1 page. (Parent, Related Application to referenced application).
U.S. Appl. No. 10/263,008, PTO-892 mailed with Nov. 15, 2006 Final Office Action, 1 page. (Parent, Related Application to referenced application).

* cited by examiner

*Primary Examiner*—Djenane M Bayard
(74) *Attorney, Agent, or Firm*—Blakely, Sokoloff, Taylor & Zafman LLP

(57) ABSTRACT

Methods and apparatuses for dynamically locating resources. In one aspect of the invention, a method to retrieve a resource for a digital processing system includes: receiving a request for a resource; downloading a first version of the resource from a server through a network connection to satisfy the request if the first version of the resource is retrievable through the network connection; and loading a second version of the resource from a storage device of the digital processing system if the first version of the resource is not retrievable through a network connection. In one example, downloading the first version is performed in response to a determination that the first version of the resource is different from a second version of the resource on a storage device of the digital processing system.

71 Claims, 7 Drawing Sheets

METHOD AND APPARATUS FOR DYNAMICALLY LOCATING RESOURCES

This application is a divisional of co-pending U.S. patent application Ser. No. 10/263,008, filed on Oct. 1, 2002.

FIELD OF THE INVENTION

The invention relates to digital processing systems, and more particularly to dynamically locating resources using network connections when available.

BACKGROUND OF THE INVENTION

On a computer system, a resource is typically specified using a file name with a path (or directory) or a Universal Resource Locator (URL). HyperText Markup Language (HTML) documents use URL addresses to specify the locations of the resources that are required by these documents or linked to these documents through hyperlinks.

A complete URL address includes the network protocol for accessing the resource, the host address of the computer on which the resource resides, the directory in which the resource resides, and the file name of the resource. For example, URL address http://www.uspto.gov/main/patents.htm specifies that HTML document patents.htm is retrievable using Hypertext Transfer Protocol (HTTP) from directory /main of host www.uspto.gov. To retrieve patents.htm, a client computer contacts host www.uspto.gov using HTTP protocol to transfer file /main/patents.html from the HTTP server at www.uspto.gov. After receiving a request from the client for an HTML document, the HTTP server at the remote host (e.g., www.uspto.gov) typically maps the directory (e.g., /main) in the URL to a directory in the file system of the server computer to locate the corresponding HTML document specified in the URL address.

Relative URL addresses are typically used in an HTML document for specifying the locations of the resources relative to the location of the HTML document. For example, HTML document at http://www.uspto.gov/main/patents.htm may contain a hyperlink to relative URL address ./search.htm. From the base address of HTML document patents.htm, it can be determined that the complete address of document search.htm is http://www.uspto.gov/main/search.htm.

URL addresses can also be used to specify resources which reside locally on a computer system. For example, URL address file:///C:/main/patents.htm specifies an HTML document on a local hard drive C. A file on a computer is typically specified as a file name with a path. For example, file name C:/main/patents.htm contains path C:/main/. A file name with a path can also be considered as a relative URL address with a default base address (e.g., file:///)

URL addresses specify the exact locations of the corresponding resources so that a web browser can retrieve the resources from the locations as specified in the URL addresses. When the storage locations of the resources are moved (e.g., from a remote server to a local file system), the corresponding URL addresses for accessing these resources are changed accordingly in order to access the resources from the new locations. When relative URL addresses are used, only the base addresses are changed accordingly. The complete addresses for the relative URL addresses are changed automatically to reflect the changes in the base addresses, since the complete addresses for the relative URL addresses are computed from the base addresses and the relative URL addresses.

A web browser typically maintains a cache that stores some of the files retrieved from remote servers through a network connection. Such a web browser may use the resource stored in the cache to display a document when it assumes or determines that the resource on the remote server has not changed since the resource was downloaded and cached. For example, when the forward (or back) button on a web browser is pressed, the previous downloaded and cached version of the resource is used, assuming that there has been no change in the resource. When no network connection to the server is available, a web browser typically displays an error message, even when a version of the resource is previously downloaded and cached. A user may manually switch the web browser (e.g., Internet Explorer) from an online mode to an offline mode (e.g., work offline). When the web browser is in an offline mode, it can display, without a network connection, the web pages that have already been down loaded in the cache. If the user clicks on a link for a document that is not in the cache when the web browser is in the offline mode, the web browser informs the user that the document is not available in the offline mode; and the user has the option to keep the web browser in the offline mode or switch the web browser back to the online mode.

SUMMARY OF THE DESCRIPTION

Methods and apparatuses for dynamically locating resources are described here.

In one aspect of the invention, a method to retrieve a resource for a digital processing system includes: receiving a request for a resource; downloading a first version of the resource from a server through a network connection to satisfy the request if the first version of the resource is retrievable through the network connection; and loading a second version of the resource from a storage device of the digital processing system if the first version of the resource is not retrievable through a network connection. In one example according to this aspect, the network connection is automatically established before downloading the first version of the resource from the server, if the network connection is not already established. For example, a modem is instructed to initiate a connection to establish the network connection.

In one example, downloading the first version is performed in response to a determination that the first version of the resource is different from the second version of the resource on the storage device of the digital processing system. Thus, when the server has an updated version of the resource, the updated version of the resource is downloaded to satisfy the request. If no network connection to the server is available or downloading from the server is not successful, the second version of the resource from the storage device on the digital processing system is loaded to satisfy the request.

In one example, downloading from the server is performed if it is determined that a version of the resource on the server is preferred. The first version of the resource downloaded from the server is stored on the storage device of the digital processing system if downloading is successful. If it is determined that a version of the resource on the server is not preferred, the second version of the resource is loaded from the storage device on the digital processing system to satisfy the request. If a previously downloaded version of the resource exists on the storage device, the previously downloaded version of the resource is used to satisfy the request. Thus, the second version of the resource is different from the resource, if the second version of the resource is a previously downloaded version of the resource.

In one example, whether or not a version of the resource on a server is preferred is determined from a configuration file associated with the resource. An address of the server is also determined from the configuration file. In other examples, whether or not a version of the resource on a server is preferred is determined according to system conditions, and/or a file on a remote server. The address of the server may be hardwired, or determined from a search at a remote server, or determined from a file at a remote server.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
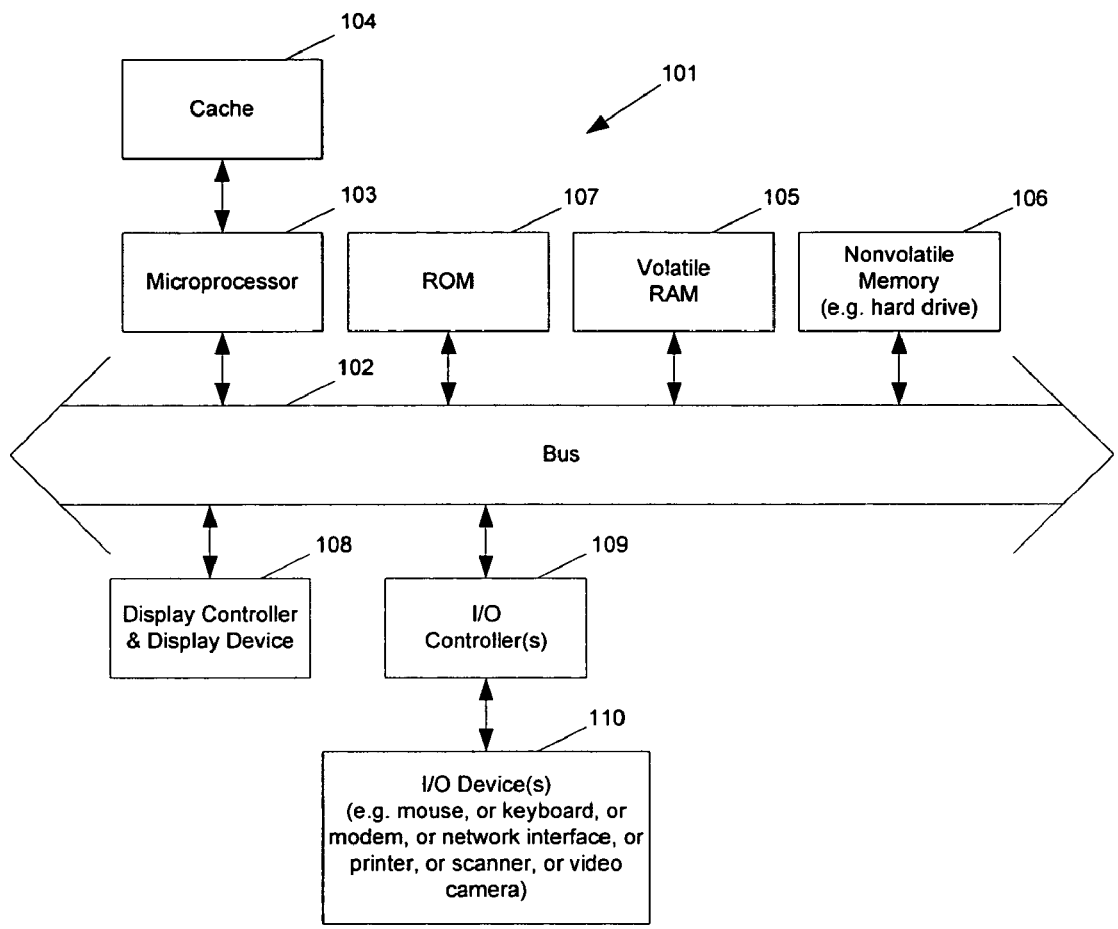
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.

At least one embodiment of the present invention seeks to dynamically locate resources so that an updated version of a resource on a remote server is used when the updated version of the resource is accessible. When the updated version of the resource is not accessible (or does not exist), a local version of the resource (e.g., a locally installed default version, a local version in a storage medium, such as a CD-ROM, a previously downloaded updated version, which may or may not have already been installed, or others) is used.

For example, in an HTML-based Help system, elements that appear on a page (e.g., images, audio clips, video clips, etc.) and hyperlinks to other pages are typically specified using URL addresses. Since the URL addresses specify the exact predetermined locations of the resources, a resource is normally either on the local file system or on a remote server. If the location is at the remote server, the resource can be easily updated; and the updated version of the resource is used after the resource is updated at the remote server. However, when the client computer cannot access the server (e.g., through the network), the client computer cannot retrieve the required resource from the remote server to provide the corresponding help document. If the location of the item is locally at the client computer, the resource can always be accessed regardless of the status of the network connectivity. However, a special procedure is required to update the resource (e.g., downloading and installing a software patch).

Figure 2:
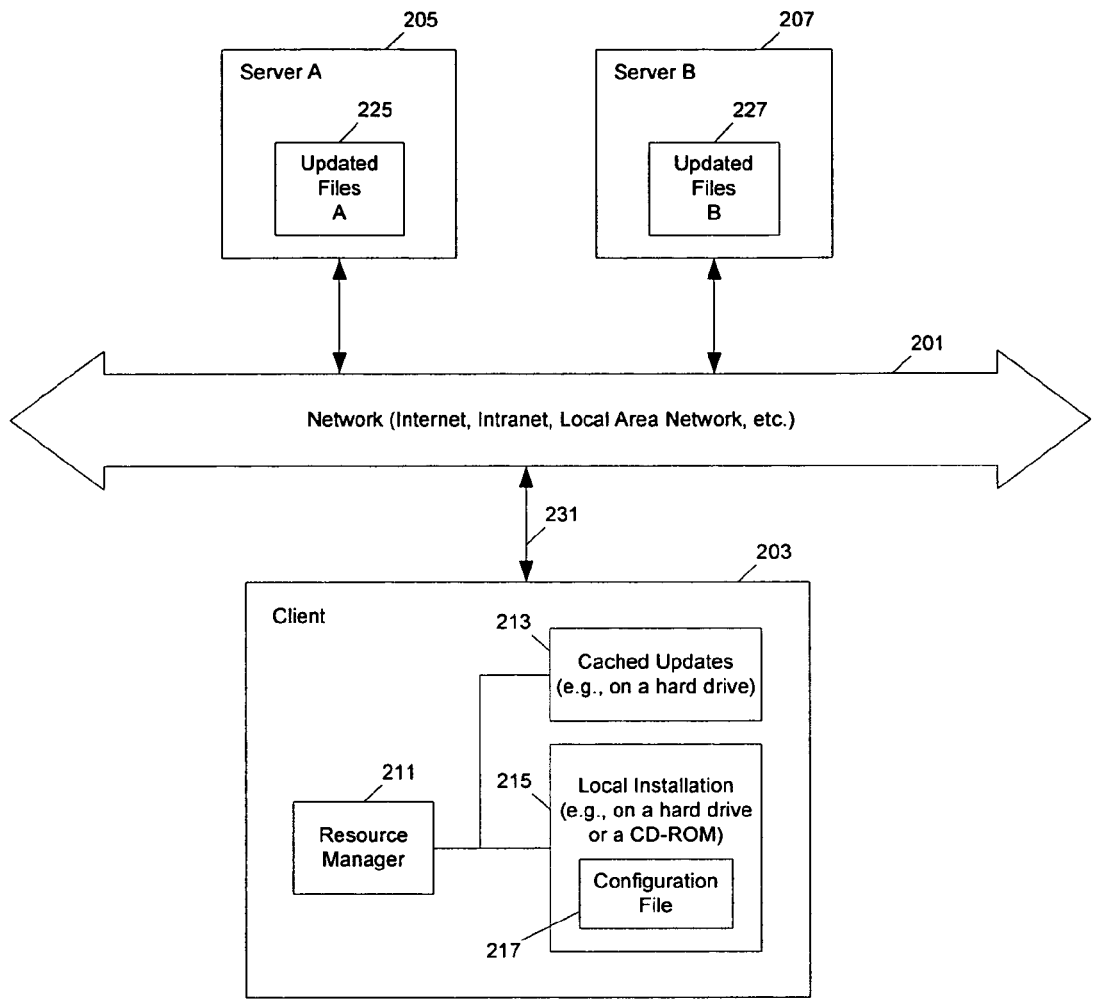
FIG. 2 shows a schematic diagram of a system for updating files through a network according to one embodiment of the present invention.

FIG. 2 shows a schematic diagram of a system for updating files through a network according to one embodiment of the present invention. Client computer 203 contains resource manager 211, which dynamically locates a resource according to configuration file 217. Local installation 215 contains a default version of the resources on a local storage device (e.g., a hard drive, or a CD-ROM), which can always be accessed by client computer 203, regardless of the status of the network connection. When client computer 203 is connected to network 201 (e.g., Internet, intranet, Local Area Network (LAN), etc.) through communication link 231 (e.g., a modem attached to a telephone line, a network interface card attached to a network cable, a cable modem attached to a cable television network, a transceiver for a wireless communication network, etc), an updated version of the resource can be retrieved from servers, such as server 205 or 207. When downloaded, the updated version of the resource is stored as cached updates 213 on client computer 203 so that the updated version of the resource can be used later without resorting to the servers. Configuration file 217 specifies the addresses of the remote servers for updated versions of resources. Configuration file 217 can also store additional information, such as whether or not a version of the resource on the remote server is preferred. When a version of the resource on the remote server is preferred, the remote server is always checked for an updated version when network connection 231 is available; otherwise, either the cached update or the local installation is used. Thus, depending on the configuration parameters in configuration file 217, resource manager 211 either retrieves updated versions of the resources for the local installation from one or more servers or loads cache updates or the local installation from a local storage device. It will be understood that various different types of protocols (e.g., HTTP, FTP (File Transfer Protocol)), servers, and network connection media (e.g., Ethernet network interface cards, modems for telephone lines, cable television networks, or Digital Subscriber Lines (DSL), transceivers for wireless networks) can be used with various embodiments of the present invention in retrieving updated versions of resources through network connections. Methods to dynamically locate the resources are described bellow.

Figure 3:
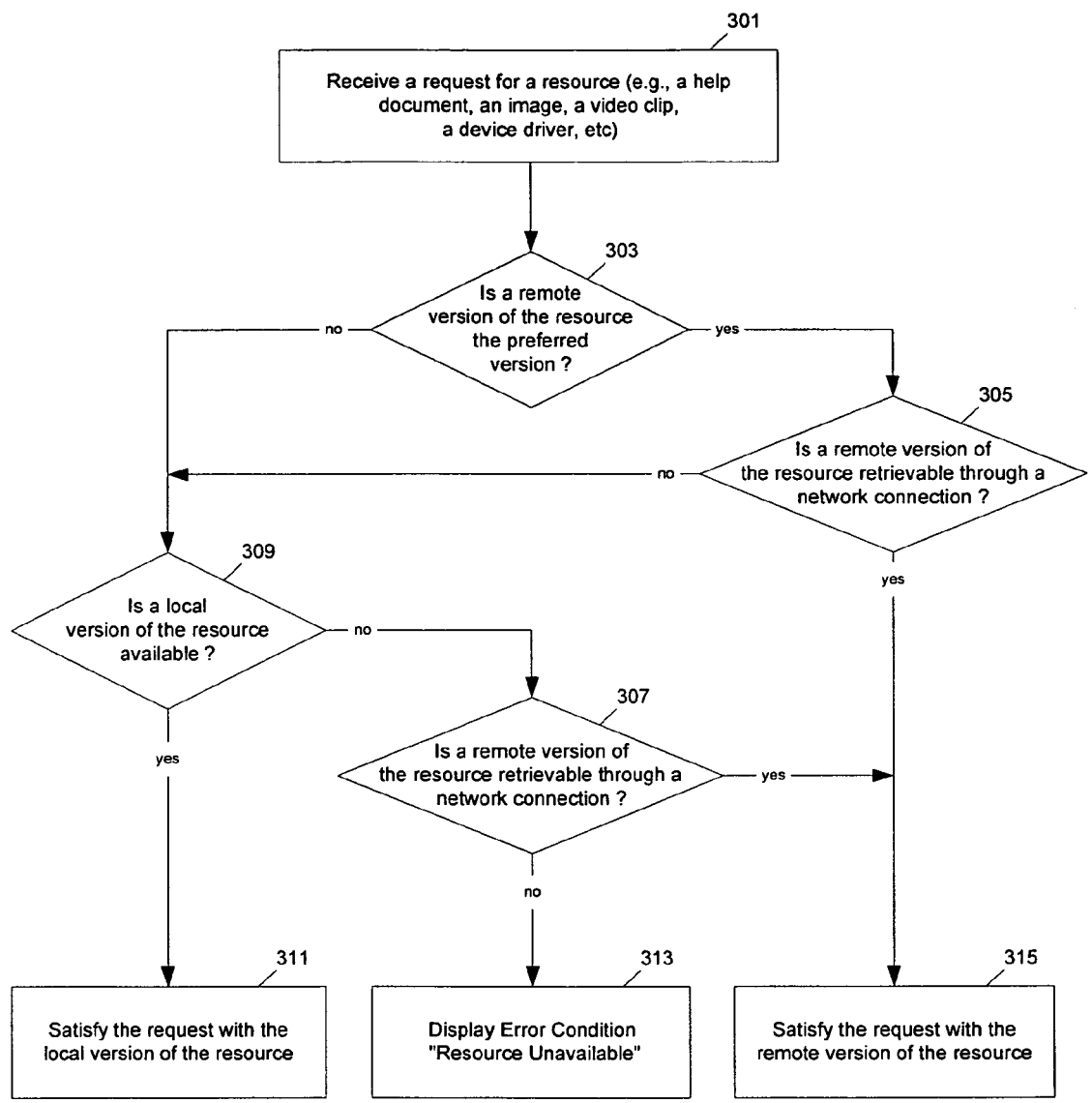
FIG. 3 shows a flow chart of a method to locate a resource according to one embodiment of the present invention.

FIG. 3 shows a flow chart of a method to locate a resource according to one embodiment of the present invention. Operation 301 receives a request for a resource (e.g., a help document, an image, a video clip, a device driver, etc). From a configuration file operation 303 determines whether or not a remote version of the resource is the preferred version. If a remote version of the resource is the preferred version, operation 305 determines whether or not a remote version of the resource is retrievable through a network connection. When a remote version of the resource is retrievable through a network connection, operation 315 satisfies the request with the remote version of the resource. If operation 305 determines that a remote version of the resource is not retrievable through a network connection, or operation 303 determines that a remote version of the resource is not the preferred version, operation 309 is performed to determine whether or not a local version of the resource is available. When a local version of the resource is available, operation 311 satisfies the request with the local version of the resource; otherwise, if operation 307 determines that a remote version of the resource is retrievable through a network connection, operation 315 satisfies the request with the remote version of the resource. If operation 307 determines that a remote version of the resource is not retrievable through a network connection, operation 313 displays a message to indicate that the resource is not available.

Figure 4:
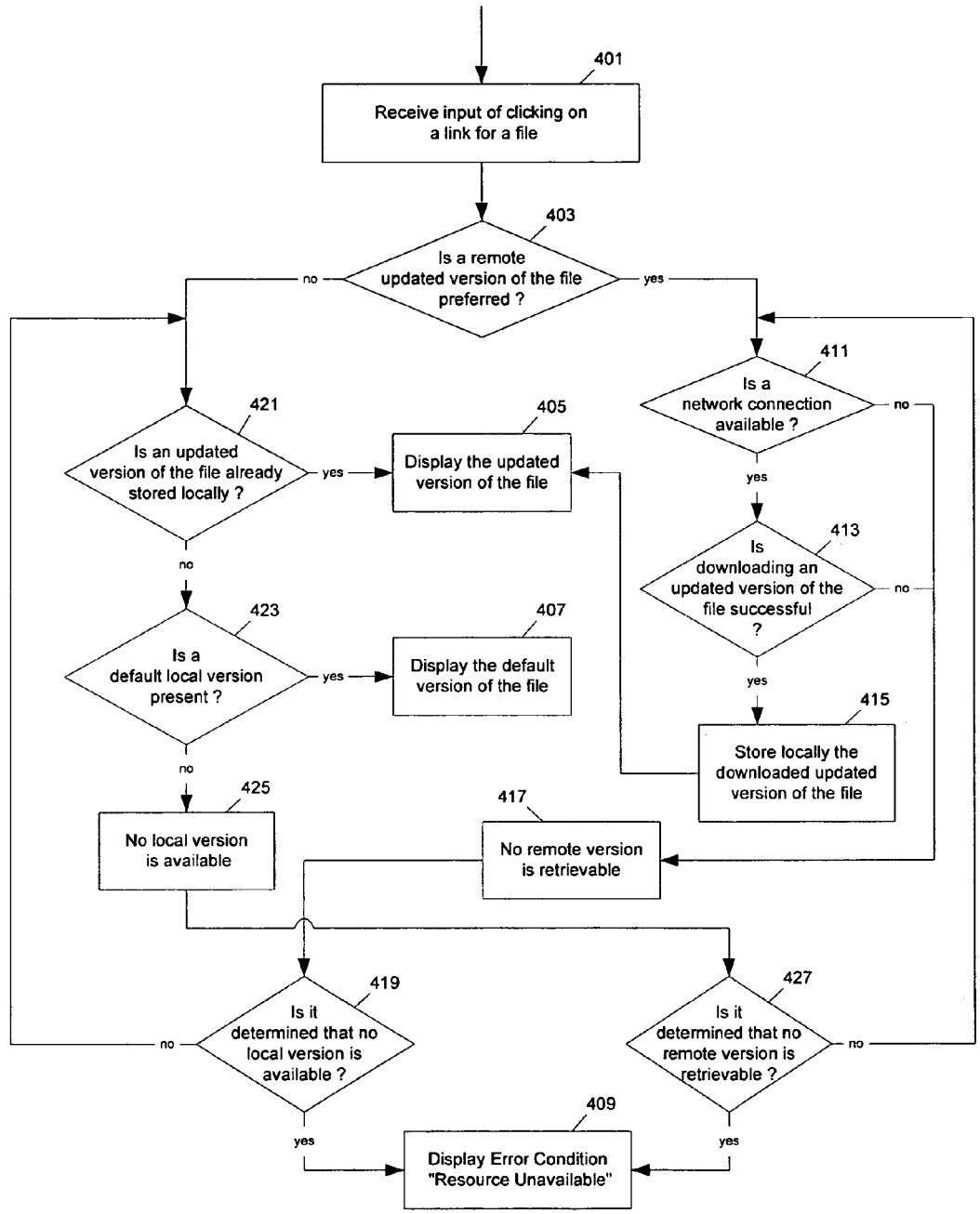
FIG. 4 shows a detailed flow chart of a method to locate a file according to one embodiment of the present invention.

FIG. 4 shows a detailed flow chart of a method to locate a file according to one embodiment of the present invention. After operation 401 receives an input of clicking on a link for a file (e.g., by positioning a mouse controlled cursor on an item, representing a file, displayed on a display screen which is coupled to the mouse and by selecting the item by pressing and releasing a button while the cursor is on the item), operation 403 determines whether or not a remote updated version of the file is preferred. If a remote updated version of the file is preferred, operation 411 is performed to determine whether or not a network connection is available; and operation 413 determines whether or not an updated version of the file is successfully downloaded if a network connection is available. If downloading an updated version of the file is successful, operation 415 stores the downloaded updated version of the file on a local storage device; and operation 405 displays the updated version of the file. When no network connection is available, or downloading an updated version of the file is not successful, it is concluded that no remote version is retrievable in operation 417; and operation 419 is performed to determine whether or not it is already determined that no local version is available. If it is already determined that no local version is available, operation 409 displays an error message to indicate the error condition "resource unavailable"; otherwise, operation 421 is performed. If operation 403 determines that a remote updated version of the file is not preferred, operation 421 is performed to determine whether or not an updated version of the file is already cached in a local storage device; and operation 423 determines whether or not a default local version is present if no updated version of the file is cached. If an updated version of the file is already stored locally, operation 405 displays the updated version of the file. If a default local version is present, operation 407 displays the default version of the file. When no updated version of the file is stored locally and no default local version is present, it is concluded that no local version is available in operation 425; and operation 427 is performed to determine whether or not it is already determined that no remote version is retrievable. If it is already determined that no local version is retrievable, operation 409 displays an error message; otherwise, operation 411 is performed.

Figure 5:
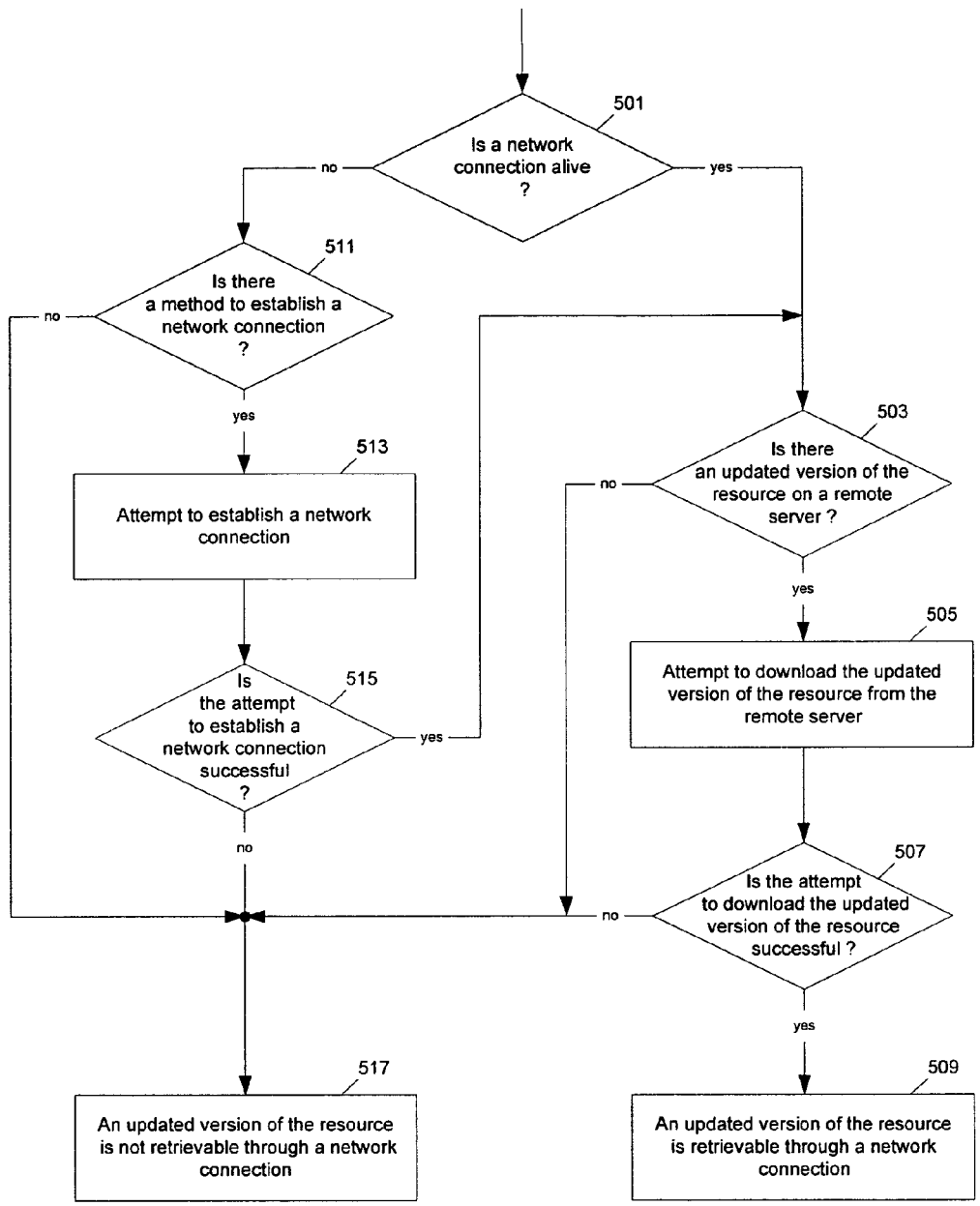
FIG. 5 illustrates an example flow diagram of a method to determine whether or not an updated version of a resource is retrievable through a network connection according to one embodiment of the present invention.

FIG. 5 illustrates an example flow diagram of a method to determine whether or not an updated version of a resource is retrievable through a network connection according to one embodiment of the present invention. Operation 501 determines whether or not a network connection is alive. If no network connection is alive and operation 511 determines that there is a method to establish a network connection, operation 513 attempts to establish a network connection (e.g., instruct a modem to call an Internet service provider, etc.). If operation 515 determines that the attempt to establish a network connection is successful, operation 503 is performed. If there is no method to establish a network connection, or the attempt to establish a network connection failed, it is concluded that an updated version of the resource is not retrievable through a network connection in operation 517. If operation 501 determines that a network connection is alive and operation 503 determines that there is an updated version of the resource on a remote server, operation 505 attempts to download the updated version of the resource from the remote server. If operation 507 determines that downloading the updated version of the resource is successful, it is concluded that an updated version of the resource is retrievable through a network connection in operation 509. If operation 503 determines that there is no updated version of the resource at a remote server, or operation 507 determines that downloading the updated version of the resource is not successful, it is concluded that an updated version of the resource is not retrievable through a network connection in operation 517.

FIGS. 4 and 5 show example sequences of checking for an updated version of resources from a remote server, cached updates, and local installation. From this description, it will be apparent to one skilled in the art that various different sequences can be used or configured using configuration parameters. For example, it may be configured that the cached updates are searched first for an updated version of the resource before attempting to contact the remote server for an updated version. Further, some resources are frequently used. Thus, it is not desirable to check the remote server for an update version every time these resources are used. Thus, control parameters can be used to limit the frequency to check the remote server for the updated version. For example, an HTML document can have a tag to specify when a cached document expires; or the resource manager can maintain a default frequency for checking the remote server; or such a frequency related configuration parameter for checking the remote server can be specified in the configuration file.

Further various methods can be used to determine whether or not the updated version of the resource on the server is different from (or more recent than) a version on the local storage device. For example, "HTTP conditional get" can be used to download a resource that is modified. An HTTP server that meets the HTTP 1.1 specification returns "304 File Not Modified" to indicate that the resource on the server is the same as that in the cached updates. In another embodiment of the invention, a version number is used to determine whether the server contains an update version for the resource.

Figure 6:
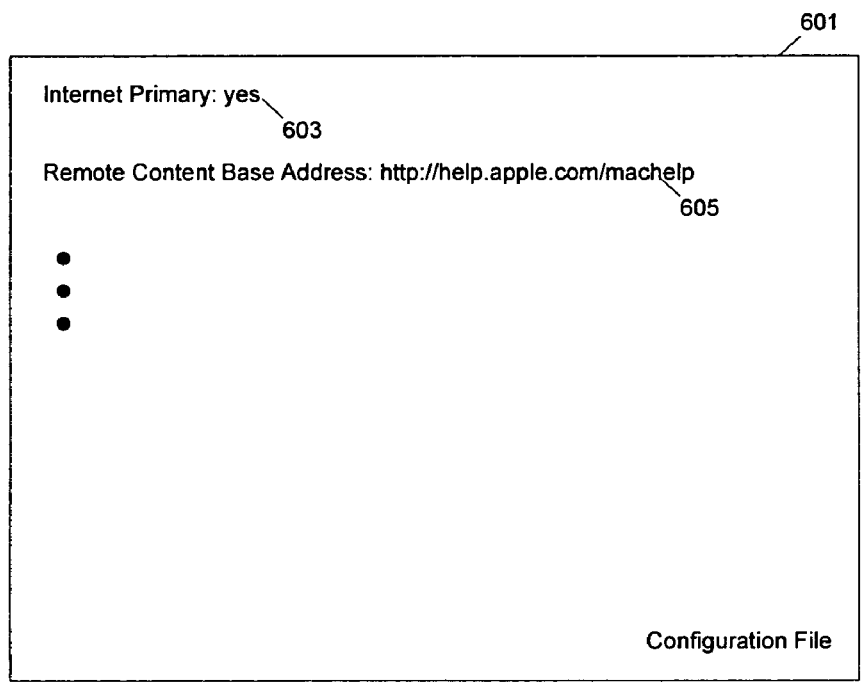
FIG. 6 illustrates a configuration file for specifying parameters for dynamically locating resources according to one embodiment of the present invention.

FIG. 6 illustrates a configuration file for specifying parameters for dynamically locating resources according to one embodiment of the present invention. Configuration file 601 contains entry 603 which specifies whether or not the resource controlled by the configuration file is "internet primary". If it is "internet primary", a remote updated version is preferred; otherwise, a remote updated version is not preferred. Typically, when the resource is newly released, it can be set to "internet primary" so that updates can be delivered to the users as soon as the updates are available on the server; when the final version of the resource is released or the product is no longer supported, the configuration parameter can be updated to turn off "internet primary" (e.g., when an update version of the configuration file is downloaded as a resource used for determining configuration parameters), and thus the local version is the preferred (and current) version.

Configuration file 601 also contains entry 605 which specifies the remote content base address. In one embodiment of the present invention, the remote content base address is in the URL format. Thus, the address of the remote server and the protocol to contact the remote server for retrieval are included in the remote content base address. A resource controlled by the configuration file can be accessed from a location relative to the remote content base address. In one embodiment of the present invention, the updated version of a resource having a URL address relative to the configuration file is located at the same relative address with respect to the remote content base address. For example, if: i) the configuration file is MacHelp/configuration, ii) the resource controlled by the configuration file is MacHelp/Mail/index.htm, and iii) the remote content base address is http://help.apple.com/machelp, then the complete URL for the updated version of the resource is http://help.apple.com/machelp/Mail/index.htm. From this description, it will be apparent to one skilled in the art that various configuration file formats and options can be used to map an address for a local resource to a remote address for retrieving an updated version of the resource. Furthermore, these configurations can be dynamically changed over time, such that at one point in time, the address for the resource is a remote server and another, later point in time, it is a first local file address and at yet another point in time, it is a second local file address. A configuration file can specify a number of alternative remote or local content base addresses so that the updated version of the resource may be obtained from a number of different alternative locations. Different protocols (e.g., HTTP, FTP, etc) and server addresses may be specified. In other embodiments of the present invention, a configuration file can also explicitly specify the remote addresses of the updated version of the resources. The configuration information can be embedded in certain resource files (e.g., index HTML files), or be stored in separate configuration files.

Figure 7:
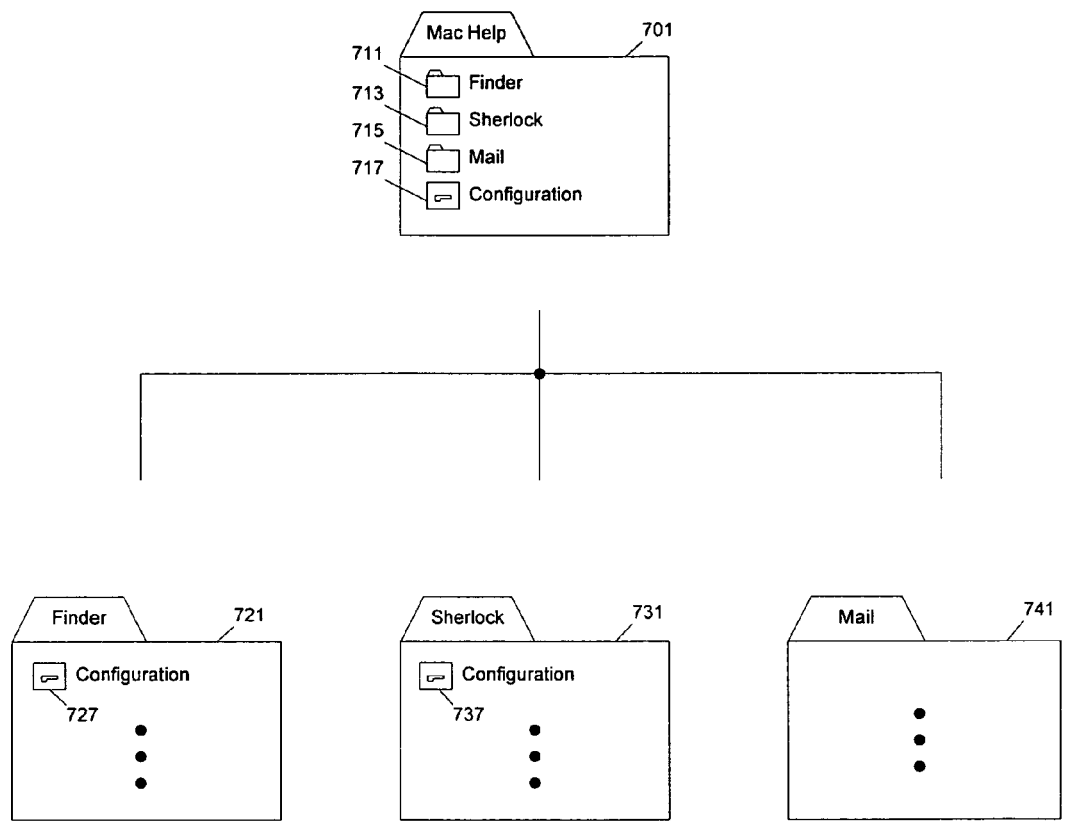
FIG. 7 illustrates a scheme to specify parameters for dynamically locating resources according to one embodiment of the present invention.

FIG. 7 illustrates a scheme to specify parameters for dynamically locating resources according to one embodiment of the present invention. The locally installed resources are organized in a typical file tree in the local file system. For example, folder 701 contains help documents on a system. Folders 711-715 located inside folder 701 contain help documents for programs Finder, Sherlock, and Mail respectively. Folders 711, 713 and 715 correspond to folders 721, 731 and 741 respectively. Configuration file 717 controls (specifies the configuration parameters for) the resource files in folder 701. A configuration file in a folder also recursively controls the resource files in its child folders of various levels that do not have configuration files in the their own folders and that do not have configuration files in the corresponding parent folders except the folder itself. For example, folder 741 contains no configuration file. Its closest parent folder that has a configuration file contains the configuration file that controls the resources in it. Thus, configuration file 717 controls the resources in folder 741. Since folders 721 and 731 contain configuration files 727 and 737 respectively, configuration file 717 will not control any of the files in folders 721 and 731 and their child folders. When such a scheme is used, existing help systems can be used without modification; and new configurations can be easily added to dynamically locate the resources according to the configuration files. The configuration files can also have corresponding remote updated versions. Thus, updated configuration files can be accessed from a server to control whether or not the remote version is preferred and to specify new locations for updated resources.

A configuration file is illustrated in the above examples to store the indicator of whether or not a version of the resource on a server is preferred. Whether or not a version of the resource on a server is preferred can also be determined according to system conditions, and/or a file on a remote server. For example, it may be determined that within a time period (e.g., one year) from a release date of the resource, the version of the resource on the server is preferred; after a time period (e.g., two years) from the release date, the version of the resource on the server is not preferred. Alternatively, a determination of whether or not a remote version of the resource is preferred can be made from other indicators, such as the release date and the version number of the operating system, the current date, options previously selected by a user, and others. Further, the address of the server may be hardwired, or determined from a search at a remote server, or determined from a file at a remote server or other locations.

When methods to dynamically locate resources according to various embodiments of the present invention are used in a Help system, such as a Help system which displays user help information for operating a computer through a web browser such as Internet Explorer, the latest version is always used when the client computer is connected to the server through a network connection (e.g., Internet). When a Help page is requested, references to the HTML resources are examined to determine if they can be substituted with newer versions on the server. However, if the client computer is not connected to the network, either copies of recently retrieved pages are used, or as a last resort, the locally installed files are displayed.

Thus, authors of the Help system don't need to know, or define, which part of the Help system will be remotely retrieved. They are free to concentrate on creating the information without the overhead of deciding which topics will be remotely or locally stored. With certain embodiments of the invention, different sections of the Help system can be designated as being local-only or remote-version-preferred. These designations can be changed at any time in the life cycle of the help documents, even after the system is installed on the client computer and even after the user has used the computer for some time. The various embodiments discussed herein typically use a help viewer program which may be a web browser, such as Internet Explorer or Netscape's Internet Navigator. These help viewer programs will typically read the help information files which include addresses which may be modified by the configuration files in the manner described herein.

The client computer transparently gets the latest "help" information, when connected to the network; yet the client computer still has full help information available, from the local file system when off the network. When new features are added, or new information about a product is available, the Help system can be silently updated (by, e.g., updating later versions from a server) and made available to the users without the necessity of publicizing and installing updated files and without requiring a software or operating system update or upgrade.

Although methods of various embodiments of the present invention are illustrated with URL addresses and HTTP protocol, it will apparent to one skilled in the art from this description that the present invention can be used with various different types of schemes for addressing and various different types protocols for retrieving resources. Further, the resources that can be dynamically located are not limited to those for displaying a document. It will be understood that various types of resources (e.g., device drivers, program components, packages for localization and translation, etc) can be dynamically located (or updated) using methods of various embodiments of the present invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to retrieve a resource for a digital processing system, the method comprising:

storing a first resource configuration parameter in a configuration file controlling the resource, wherein the configuration file includes a second resource configuration parameter indicating at least one first location of the resource, wherein the first resource configuration parameter in the configuration file that is configured to control the resource indicates whether or not the resource retrievable through a network is preferred over the resource retrievable locally from the digital processing system;

receiving a request for the resource;

determining whether a first version of the resource from a remote server controlled by the configuration file is preferred based on the first resource configuration parameter in the configuration file in response to the receiving, wherein the configuration file includes a third resource configuration parameter indicating an address of at least one second location of the first version of the resource on the remote server;

downloading the first version of the resource from the remote server through a network connection based on the third resource configuration parameter from at least one second location to satisfy the request if the first version of the resource is retrievable through the network connection, and if the first resource configuration parameter indicates that the resource is preferably retrieved through the network; and loading a second version of the resource from a storage device of the digital processing system based on the second resource configuration parameter from the first location if the first version of the resource is not retrievable through the network connection.

2. A method as in claim 1 further comprising:

establishing automatically a network connection before said downloading if the network connection is not already established.

3. A method as in claim 2 wherein said establishing the network connection comprises:

instructing a modem to initiate a connection.

4. A method as in claim 1 wherein said downloading is in response to a determination that the first version of the resource is different from the second version of the resource.

5. A method as in claim 4 wherein the first version of the resource is not retrievable through the network connection if no network connection to the server is available.

6. A method as in claim 5 wherein the first version of the resource is not retrievable through a network connection if said downloading is not successful.

7. A method as in claim 1 further comprising:
determining whether or not a version of the resource on the remote server is preferred;
wherein said downloading is in response to a determination that the version of the resource on the remote server is preferred.

8. A method as in claim 7 further comprising:
loading the second version of the resource from the storage device on the digital processing system to satisfy the request in response to a determination that the version of the resource on the remote server is not preferred.

9. A method as in claim 8 wherein the second version of the resource is different from the first version of the resource.

10. A method as in claim 8 further comprising:
storing the first version of the resource on the storage device of the digital processing system if said downloading is successful.

11. A method as in claim 8 wherein whether or not the version of the resource on the server is preferred is determined from the configuration file associated with the resource.

12. A method as in claim 11 further comprising:
determining an address of the server from the configuration file.

13. The method of claim 1, wherein said configuration file includes a plurality of locations of one or more resources and wherein the configuration file is a file managed by a disk operating system operating on the data processing system.

14. The method of claim 1, wherein said at least one first location is a local address on a storage device which is part of the data processing system and wherein said at least one second location is a remote address of a storage device which is accessed by the data processing system through a network interface.

15. The method of claim 1, wherein said at least one first location provides information about a first topic and said at least second location provides update information about said first topic.

16. The method of claim 1, wherein said at least one first location is a remote address of a storage device which is accessed by the data processing system through a network interface.

17. The method of claim 1, further comprising
modifying said at least one configuration data to change said first location to said at least one second location.

18. A machine readable storage medium storing executable computer program instructions which when executed by a digital processing system cause said system to perform a method to retrieve a resource for the digital processing system, the method comprising:
storing a first configuration parameter in a configuration file controlling the resource, wherein the configuration file includes a second configuration parameter indicating a first location of the resource, wherein the first resource configuration parameter in the configuration file that is configured to control the resource indicates whether or not the resource retrievable through a network is preferred over the resource retrievable locally from the digital processing device;
receiving a request for the resource;
determining whether a first version of the resource from a remote server controlled by the configuration file is preferred based on the first resource configuration parameter in the configuration file in response to the receiving, wherein the configuration file includes a third resource configuration parameter indicating an address of at least one second location of the first version of the resource on the remote server;
downloading the first version of the resource from the remote server through a network connection based on the third resource configuration parameter from at least one second location to satisfy the request if the first version of the resource is retrievable through the network connection, and if the first resource configuration parameter indicates that the resource is preferably retrieved through the network; and
loading a second version of the resource from a storage device of the digital processing system based on the second resource configuration parameter from the first location if the first version of the resource is not retrievable through the network connection.

19. A medium as in claim 18 wherein the method further comprises:
establishing automatically a network connection before said downloading if the network connection is not already established.

20. A medium as in claim 19 wherein said establishing the network connection comprises:
instructing a modem to initiate a connection.

21. A medium as in claim 18 wherein said downloading is in response to a determination that the first version of the resource is different from the second version of the resource.

22. A medium as in claim 21 wherein the first version of the resource is not retrievable through the network connection if no network connection to the server is available.

23. A medium as in claim 22 wherein the first version of the resource is not retrievable through a network connection if said downloading is not successful.

24. A medium as in claim 18 wherein the method further comprises:
determining whether or not a version of the resource on the remote server is preferred;
wherein said downloading is in response to a determination that the version of the resource on the remote server is preferred.

25. A medium as in claim 24 wherein the method further comprises:
loading the second version of the resource from the storage device on the digital processing system to satisfy the request in response to a determination that the first version of the resource on the remote server is not preferred.

26. A medium as in claim 25 wherein the second version of the resource is different from first version of the resource.

27. A medium as in claim 25 wherein the method further comprises:
storing the first version of the resource on the storage device of the digital processing system if said downloading is successful.

28. A medium as in claim 25 wherein whether or not the version of the resource on the server is preferred is determined from the configuration file associated with the resource.

29. A medium as in claim 28 wherein the method further comprises:
determining an address of the server from the configuration file.

30. The machine readable medium of claim 18, wherein said configuration file includes a plurality of locations of one or more resources and wherein the configuration file is a file managed by a disk operating system operating on the data processing system.

31. The machine readable medium of claim 18, wherein said at least one first location is a local address on a storage device which is part of the data processing system and wherein said at least one second location is a remote address of a storage device which is accessed by the data processing system through a network interface.

32. The machine readable medium of claim 18, wherein said at least one first location provides information about a first topic and said at least one second location provides update information about said first topic.

33. The machine readable medium of claim 18, wherein said at least one first location is a remote address of a storage device which is accessed by the data processing system through a network interface.

34. The machine readable medium of claim 18, further containing executable computer program instructions which when executed by a digital processing system cause said system to perform a method further comprising
modifying said at least one configuration data to change said first location to said at least one second location.

35. A digital processing system to retrieve a resource, the digital processing system comprising:
means for storing a first resource configuration parameter in a configuration file controlling the resource, wherein the configuration file includes a second configuration parameter indicating at least one first location of the resource, wherein the first resource configuration parameter in the configuration file that is configured to control the resource indicates whether or not the resource retrievable through a network is preferred over the resource retrievable locally from the digital processing system;
means for receiving a request for the resource;
means for determining whether a first version of the resource from a remote server controlled by the configuration file is preferred based on the first resource configuration parameter in the configuration file in response to the receiving, wherein the configuration file includes a third resource configuration parameter indicating an address of at least one second location of the first version of the resource on the remote server;
means for downloading the first version of the resource from the remote server through a network connection based on the third resource configuration parameter from at least one second location to satisfy the request if the first version of the resource is retrievable through the network connection, and if the first resource configuration parameter indicates that the resource is preferably retrieved through the network; and
means for loading a second version of the resource from a storage device of the digital processing system based on the second resource configuration parameter from the first location if the first version of the resource is not retrievable through the network connection.

36. A digital processing system as in claim 35 further comprising:
means for establishing automatically a network connection before downloading the first version of the resource if the network connection is not already established.

37. A digital processing system as in claim 36 wherein means for said establishing the network connection comprises:
means for instructing a modem to initiate a connection.

38. A digital processing system as in claim 35 wherein downloading the first version of the resource is in response to a determination that the first version of the resource is different from the second version of the resource.

39. A digital processing system as in claim 38 wherein the first version of the resource is not retrievable through a network connection if no network connection to the server is available.

40. A digital processing system as in claim 39 wherein the first version of the resource is not retrievable through the network connection if said downloading is not successful.

41. A digital processing system as in claim 35 further comprising:
means for determining whether or not a version of the resource on the remote server is preferred;
wherein downloading the first version of the resource is in response to a determination that the version of the resource on the remote server is preferred.

42. A digital processing system as in claim 41 further comprising:
means for loading the second version of the resource from the storage device on the digital processing system to satisfy the request in response to a determination that the first version of the resource on the remote server is not preferred.

43. A digital processing system as in claim 42 wherein the second version of the resource is different from the first version of the resource.

44. A digital processing system as in claim 42 further comprising:
means for storing the first version of the resource on the storage device of the digital processing system if downloading the first version of the resource is successful.

45. A digital processing system as in claim 42 wherein whether or not the version of the resource on a server is preferred is determined from the configuration file associated with the resource.

46. A digital processing system as in claim 45 further comprising:
means for determining an address of the server from the configuration file.

47. The digital processing system of claim 35, wherein said configuration file includes a plurality of locations of one or more resources and wherein the configuration file is a file managed by a disk operating system operating on the data processing system.

48. The digital processing system of claim 35, wherein said at least one first location is a local address on a storage device which is part of the data processing system and wherein said at least one second location is a remote address of a storage device which is accessed by the data processing system through a network interface.

49. The digital processing system of claim 35, wherein said at least one first location provides information about a first topic and said at least one second location provides update information about said first topic.

50. The digital processing system of claim 35, wherein said at least one first location is a remote address of a storage device which is accessed by the data processing system through a network interface.

51. The digital processing system of claim 35, further comprising
modifying said at least one configuration data to change said first location to said at least one second location.

52. A method of specifying locations for information in a help system of a data processing system, said method comprising:
storing configuration data in a configuration file that is configured to control the information for the help system, the configuration data include a first information configuration parameter indicating a first address of at least one first location of the information on a remote server for said help system that is controlled by the configuration file, wherein the configuration data further include a second information configuration parameter indicating whether the information for the help system retrievable through a network is preferred over the information for the help system retrievable locally from the digital processing system;

storing a help viewer program which displays the help information based on the first information configuration parameter from said first address of the at least one location; and dynamically, over time, modifying said the first information configuration parameter in the configuration file to change said first address of the at least one location to a second address of at least one modified location; wherein said help viewer program displays help information based on the modified first information configuration parameter from said second address of the at least one modified location if the second configuration parameter indicates that the information for the help system is preferably retrieved through the network.

53. A method as in claim 52 wherein said configuration data in the configuration file specifies a plurality of locations of information for said help system and wherein said configuration file is a file managed by a disk operating system operating on the data processing system.

54. A method as in claim 52 wherein said first address is a local address on a storage device which is part of the data processing system and wherein said second address is a remote address of a storage device which is accessed by the data processing system through a network interface.

55. A method as in claim 52 wherein said at least one location provides information about a first topic and said at least one modified location provides update information about said first topic.

56. A method as in claim 52 wherein said first address is a remote address of a storage device which is accessed by the data processing system through a network interface.

57. A machine readable storage medium storing executable computer program instructions which when executed by a digital processing system cause said system to perform a method to specify locations for information in a help system of the data processing system, the method comprising:

storing information configuration data in a configuration file that is configured to con the information for the help system, the information configuration data include a first information configuration parameter indicating a first address of at least one location of the information on a remote server for said help system that is controlled by the configuration file, wherein the information configuration data further includes a second information configuration parameter indicating whether the information for the help system retrievable through a network is preferred over the information for the help system retrievable locally from the digital processing system;

storing a help viewer program which displays the help information based on the first information configuration parameter from said first address of the at least one location; and dynamically, over time, modifying said first information configuration parameter to change said first address of the at least one location to a second address of at least one modified location; wherein said help viewer program displays help information based on the modified first information configuration parameter from said second address of the at least one modified location and if the second configuration parameter indicates that the information for the help system is preferably retrieved through the network.

58. A machine readable medium as in claim 57 wherein said configuration data in the configuration file specifies a plurality of locations of information for said help system and wherein said configuration file is a file managed by a disk operating system operating on the data processing system.

59. A machine readable medium as in claim 57 wherein said first address is a local address on a storage device which is part of the data processing system and wherein said second address is a remote address of a storage device which is accessed by the data processing system through a network interface.

60. A machine readable medium as in claim 57 wherein said at least one location provides information about a first topic and said at least one modified location provides update information about said first topic.

61. A machine readable medium as in claim 57 wherein said first address is a remote address of a storage device which is accessed by the data processing system through a network interface.

62. A data processing system to specify locations for information in a help system of a data processing system, said data processing system comprising:

means for storing information configuration data in a configuration file that is configured to control the information for the help system, the information configuration data include a first information configuration parameter indicating a first address of at least one location of the information on a remote server for said help system that is controlled by the configuration file, wherein the information configuration data further include a second information configuration parameter indicating whether the information for the help system retrievable through a network is preferred over the information for the help system retrievable locally from the digital processing system;

means for storing a help viewer program which displays the help information based on the first information configuration parameter from said first address of the at least one location; and means for dynamically, over time, modifying said the first information configuration parameter in the configuration file to change said first address of the at least one location to a second address of at least one modified location; wherein said help viewer program displays help information based on the modified first information configuration parameter from said second address of the at least one modified location and if the second configuration parameter indicates that the information for the help system is preferably retrieved through the network.

63. A data processing system as in claim 62 wherein said configuration data in the configuration file specifies a plurality of locations of information for said help system and wherein said configuration file is a file managed by a disk operating system operating on the data processing system.

64. A data processing system as in claim 62 wherein said first address is a local address on a storage device which is part of the data processing system and wherein said second address is a remote address of a storage device which is accessed by the data processing system through a network interface.

65. A data processing system as in claim 62 wherein said at least one location provides information about a first topic and said at least one modified location provides update information about said first topic.

66. A data processing system as in claim 62 wherein said first address is a remote address of a storage device which is accessed by the data processing system through a network interface.

67. A data processing system to specify locations for information in a help system of a data processing system, said method comprising:

- a memory to store configuration data in a configuration file that is configured to control the information for the help system, wherein the configuration data include a first information configuration parameter specifying a first address of at least one location of information on a remote server for said help system that is controlled by the configuration file, wherein the configuration data further include a second information configuration parameter indicating whether the information for the help system retrievable through a network is preferred over the information for the help system retrievable locally from the digital processing system, wherein the memory is to store a help viewer program which displays the help information based on the first information configuration parameter from said first address of the at least one location;
- a processor coupled to the memory, the processor configured to dynamically, over time, modify said the first information configuration parameter in the configuration file to change said first address of the at least one location to a second address of at least one modified location; wherein said help viewer program displays help information based on the modified first information configuration parameter from said second address of the at least one modified location if the second configuration parameter indicates that the information for the help system is preferably retrieved through the network.

68. A data processing system as in claim 67 wherein said configuration data in the configuration file specifies a plurality of locations of information for said help system and wherein said configuration file is a file managed by a disk operating system operating on the data processing system.

69. A data processing system as in claim 67 wherein said first address is a local address on a storage device which is part of the data processing system and wherein said second address is a remote address of a storage device which is accessed by the data processing system through a network interface.

70. A data processing system as in claim 67 wherein said at least one location provides information about a first topic and said at least one modified location provides update information about said first topic.

71. A data processing system as in claim 67 wherein said first address is a remote address of a storage device which is accessed by the data processing system through a network interface.

* * * * *

UNITED STATES PATENT AND TRADEMARK OFFICE
CERTIFICATE OF CORRECTION

| | | |
|---|---|---|
| PATENT NO. | : 7,730,159 B1 | Page 1 of 1 |
| APPLICATION NO. | : 11/647057 | |
| DATED | : June 1, 2010 | |
| INVENTOR(S) | : Gordon Ross Meyer et al. | |

It is certified that error appears in the above-identified patent and that said Letters Patent is hereby corrected as shown below:

In column 1, line 53, after "(e.g., file:///)" insert -- . --.

In column 6, line 2, delete "bellow" and insert -- below --, therefor.

In column 8, line 56, delete "the their" and insert -- their --, therefor.

In column 15, line 46, in Claim 57, delete "con" and insert -- control --, therefor.

Signed and Sealed this
Twenty-fifth Day of October, 2011

David J. Kappos
*Director of the United States Patent and Trademark Office*